A. HARF.
COMBINED SOLDERING IRON, TORCH, AND PORTABLE LIGHT.
APPLICATION FILED JUNE 22, 1908.
912,673.
Patented Feb. 16, 1909.
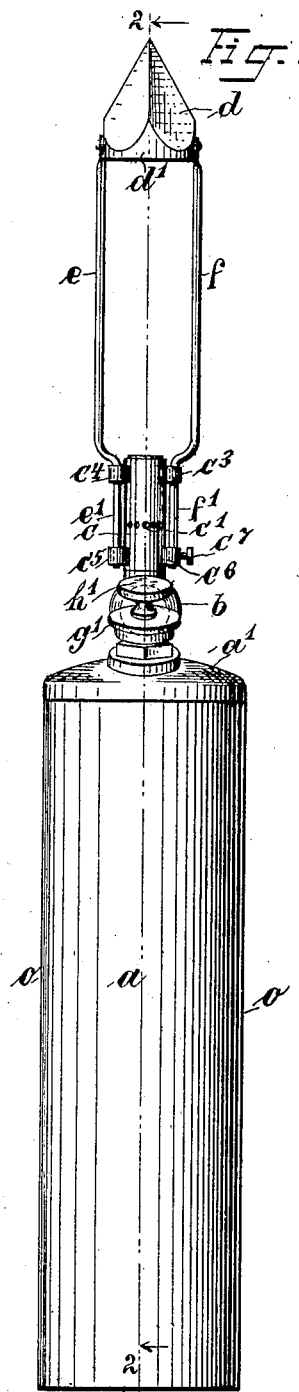
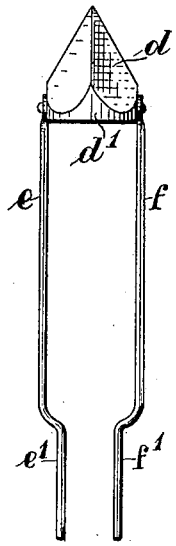
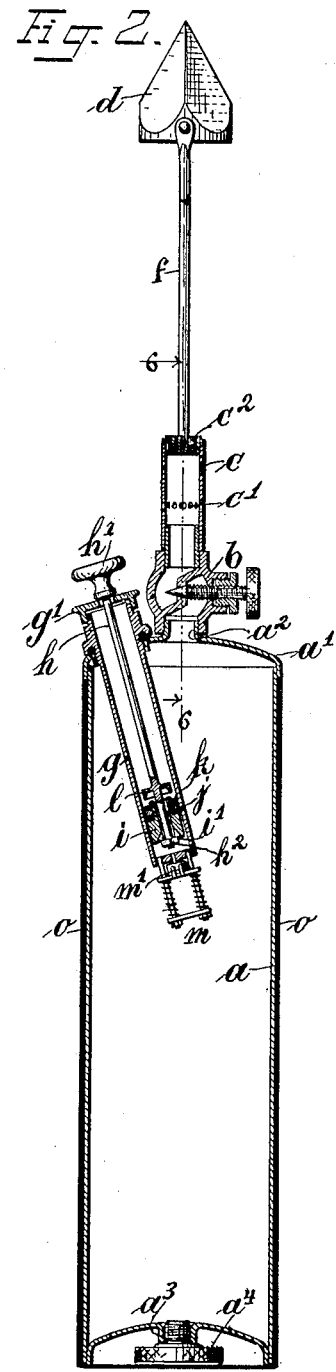
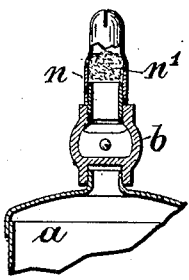

UNITED STATES PATENT OFFICE.

ARTHUR HARF, OF NEW YORK, N. Y.

COMBINED SOLDERING-IRON, TORCH, AND PORTABLE LIGHT.

No. 912,673.  Specification of Letters Patent.  Patented Feb. 16, 1909.

Application filed June 22, 1908. Serial No. 439,652.

*To all whom it may concern:*

Be it known that I, ARTHUR HARF, a citizen of the Empire of Germany, and a resident of New York, in the county and State of New York, have invented certain new and useful Improvements in a Combined Soldering-Iron, Torch, and Portable Light, of which the following is a specification.

The present invention has reference to a novel soldering iron, torch and portable light combined.

It pertains particularly to that type of soldering irons which are provided with an independent source of heat within the apparatus and therefore styled self heating devices. The soldering iron is detachable from the apparatus which then may be used as a torch in the open air and the torch burner likewise may be detached and a light burner secured thereto whereby a portable light is obtained.

By simplicity in construction liability to derangement is reduced and the cost of construction kept low so that the article may be sold at a very reasonable price and is within reach of every mechanic. Furthermore it has been attempted to secure novelty and attractiveness in appearance and still produce a substantial article which does not look unsightly or clumsy.

The novel device is a complete article in itself and appliances or contrivances need not be attached thereto when it is desired to use it. Various details of construction have also been improved with a view to the attainment of the several objects above mentioned particularly to produce a simple apparatus which consists of but few parts, and the invention further consists in the arrangement and combination of parts, all as will be fully described hereinafter with reference to the accompanying drawing in which:

Figure 1 represents in elevation a combined soldering iron, torch and portable light which embodies in desirable form the present improvements. Fig. 2 is an elevation of same at a right angle to Fig. 1 and in section on line 2, 2 of said figure. Fig. 3 is a detail view of the soldering iron detached. Fig. 4 is a detail view of the torch burner detached. Fig. 5 is a bottom view of same, and Fig. 6 shows in section the top portion of the tank on line 6, 6 of Fig. 2 with torch burner and soldering iron replaced by a light burner.

Similar characters of reference denote like parts in all the figures.

In the drawing $a$ represents a small metal cylinder which acts as a gasolene reservoir and as the handle for the soldering iron. To render the cylinder adaptable for a handle its diameter is such that it may be conveniently manipulated by the operator. For general purposes this cylinder is made about $1\frac{1}{2}$ inches in diameter. At the top the cylinder is preferably closed by a cap $a^1$ having a short neck $a^2$ to which is attached a valve $b$ of any approved construction. In the top portion of the valve $b$ there is secured a torch burner $c$ having below its central portion small air holes $c^1$ and in the top fine openings $c^2$ for the escape of the gas mixture. To the torch burner $c$ are attached four eyes $c^3$, $c^4$, $c^5$, $c^6$. The soldering iron proper $d$ is solid and of usual construction. However to its lower straight portion $d^1$ two metal rods $e$, $f$, are riveted in such location that they are opposite one another. The lower ends of these rods are preferably curved inwardly and then downward so that they are again parallel. These lower portions $e^1$, $f^1$, of the rods $e$, $f$ fit into the eyes $c^3$, $c^4$, $c^5$, $c^6$, and the small securing screw $c^7$, is provided on one of the eyes for the purpose of tightening the soldering iron so that it cannot fall out when same is turned downward.

The bottom of the cylinder $a$ is provided with a short neck $a^3$, threaded on the inside, through which the gasolene is introduced into said cylinder. A tight fitting screw $a^4$, serves for closing this opening and this bottom device is so arranged that the screw top is flush with the bottom surface of the cylinder so that same will stand upright on a table or the like.

A mixture of gasolene vapor and air is used for producing the torch flame. For this purpose air must be forced into the gasolene cylinder. This is accomplished in the present device by means of a small air pump which is located within the gasolene cylinder and forms a permanent part of the device. Thus no separate contrivance need be carried along which occupies room in a tool box nor need such contrivance be attached to or detached from the device, when same is to be used, which takes time. The air pump forming part of the present device is thus entirely out of the way and does not inconvenience the operator in the least.

The air pump may be of any approved construction, and is mounted in the top cap $a^1$ of the cylinder. The pump illustrated in the drawing consists of a cylinder $g$ extending slightly inclined into the cylinder. At the top and outside of the cylinder there is a cap $g^1$ through which passes the piston rod $h$ having a knob $h^1$ at the top and a piston arrangement on its lower portion. This arrangement consists of a block $i$ which is movable on the rod and permits air to pass between said rod and its inner opening. The block further has an annular incision $i^1$ in its bottom portion to allow the air to pass freely the nut $h^2$ at the bottom end of the piston rod. The block $i$ has an annular incision in its upper portion in which a heavy washer $j$ is located which is tight on the cylinder and represents actually the piston. A second washer $k$ is loosely secured at the top of the block $i$ and a disk $l$ of less diameter than the block $i$ is located above the loose washer. In the bottom of the cylinder $g$ there is a small opening for the escape of the air and a spring arrangement $m$ is attached to said bottom carrying a disk $m^1$ of cork or rubber which normally is pressed by the spring arrangement against the opening in the bottom of the cylinder $g$.

Assuming that the piston is in the location indicated in Fig. 2 during the operation of the pump then the air has been forced through the opening in the bottom of the pump cylinder $g$ into the gasolene cylinder $a$. Upon withdrawing the piston the block $i$ with the washers thereon lags behind and the spring arrangement closes the opening below while a rarefied space is momentarily produced in the lower portion of the pump cylinder and air rushes in passing between the piston rod and block $i$ into the lower portion of the pump cylinder. When forcing the piston down the block $i$ also lags behind and the loose washer $k$ will meet the disk $l$ of the piston rod and thus close off the air below which then is forced into the gas cylinder. On the outside of the gas cylinder a layer of heat non-conducting material $o$ may be applied. Although the arrangement does not get hot such a layer of leather or the like makes it agreeable to handle the device.

The device is operated in substantially the following manner: When a suitable pressure has been produced within the gas cylinder by pumping air into same the valve $b$ is opened and the torch flame ignited which heats the soldering iron. The size of the flame is regulated by the valve $b$. When the device is to be used as a torch the securing screw $c^7$ on the torch burner $c$ is loosened whereupon the soldering iron may be easily removed. When a gas flame is desired for lighting purposes the torch burner is screwed off and the light burner $n$ screwed thereon. This burner has within some cotton wadding $n^1$ through which the vapors pass before they reach the gas tip.

Having thus described my invention I claim as new and desire to secure by Letters Patent—

A portable self heating soldering iron, comprising a leather covered gasolene cylinder acting as the handle, an air pump in its upper portion with outside knob, a piston rod thereon, a movable block at the inner end with annular incision at the bottom and top, a tight heavy washer in the upper incision, a second loose washer at the top of the block, a small disk above same, and an opening with spring actuated closure at the bottom, a cylindrical torch burner with valve on the cylinder, and a soldering iron with metal rods bent inwardly below and again vertically down and adapted to be secured to the torch burner.

Signed at New York, N. Y., this 20th day of June, 1908.

ARTHUR HARF.

Witnesses:
　LUDWIG K. BÖHM,
　FLORA GREENWALD.